UNITED STATES PATENT OFFICE.

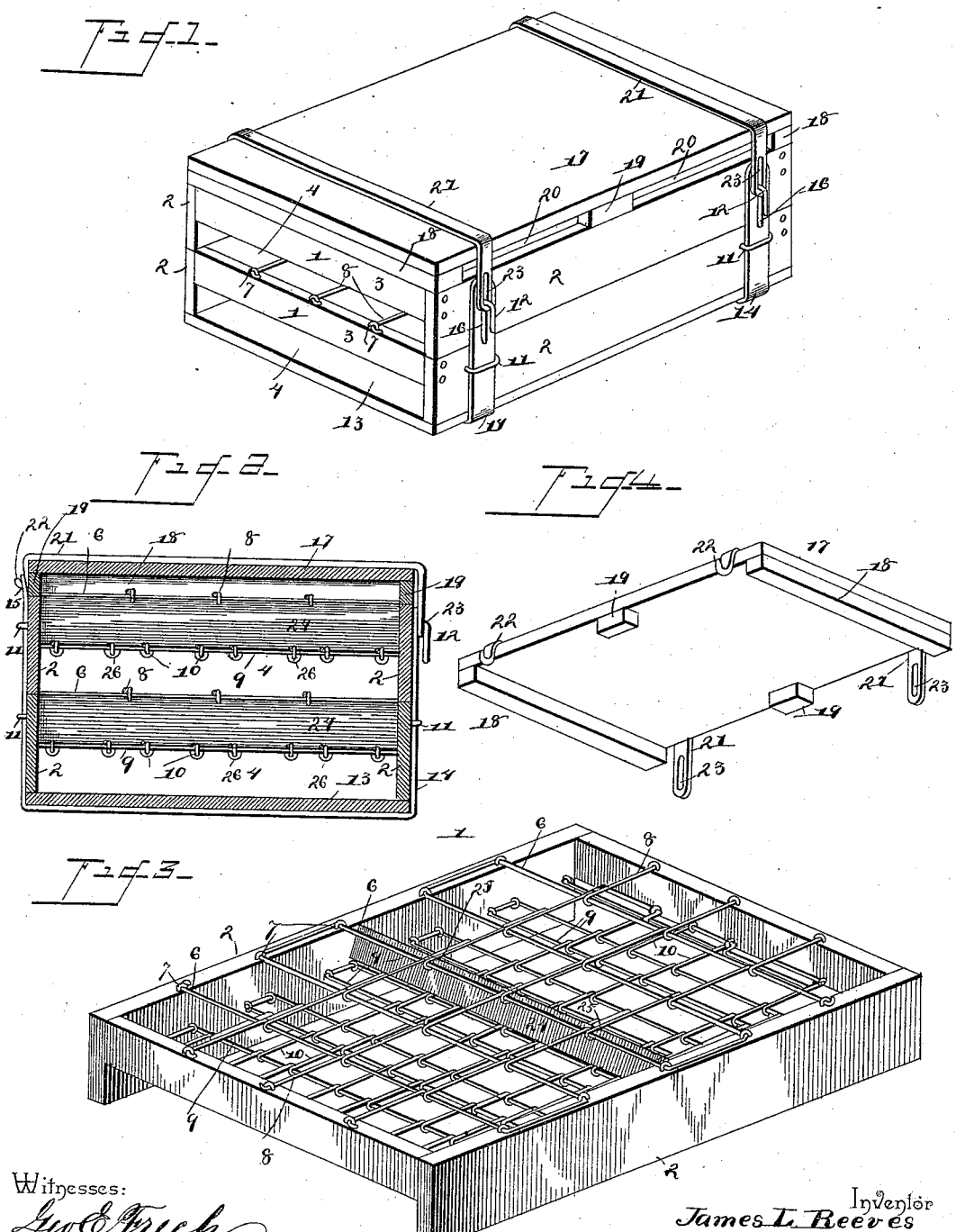

JAMES L. REEVES, OF COLLINSVILLE, ALABAMA.

EGG-CARRIER.

SPECIFICATION forming part of Letters Patent No. 430,219, dated June 17, 1890.

Application filed May 7, 1890. Serial No. 350,922. (No model.)

*To all whom it may concern:*

Be it known that I, JAMES L. REEVES, a citizen of the United States, residing at Collinsville, in the county of De Kalb and State of Alabama, have invented a new and useful Egg-Case, of which the following is a specification.

This invention has relation to egg carriers or crates for shipping purposes; and the objects of the invention are to provide a carrier or crate which may be conveniently handled, is of exceedingly cheap, durable, and simple construction, and which will so store the eggs as to make each independent of the other, thereby greatly increasing their safety during transit; furthermore, to provide means for a most thorough ventilation of the crate and for increasing or diminishing the capacity of the same.

With the above objects in view the invention consists in certain features of construction hereinafter specified, and particularly pointed out in the claims.

Referring to the drawings, Figure 1 is a perspective of an egg carrier or crate constructed in accordance with my invention. Fig. 2 is a transverse section of the same. Fig. 3 is a detail in perspective of one of the trays or sections. Fig. 4 is a detail in perspective of the top.

Like numerals of reference indicate like parts in all the figures of the drawings.

In practicing my invention I construct the carrier of a series of independent trays 1, which trays are piled one upon the other and all combine to form the completed carrier, which may be handled in the same manner as an ordinary integral case.

The trays are of oblong shape, and consist of opposite side bars 2 of a suitable depth, which are connected at their ends and at their upper sides by means of transverse end bars 3 of a width of about one-half that of the side bars, so that when a series of trays are piled one upon the other there will be formed at the opposite ends of each tray an air-space 4. The upper edges of the side bars 2 are connected by a series of parallel wire strands 6, connected to the side bars by means of staples 7, and the transverse series are connected and crossed by a series of longitudinal wires 8, likewise connected to the opposite end bars 3. The transverse wires 6 and the longitudinal wires 8 combine to form a series of egg-receiving pockets or compartments—in this instance, square; but, if desired, other designs of netting may be provided, in which the pockets are circular or of other forms. Below the egg-receiving pockets there is arranged a second netting, which is formed by series of pairs of transverse wires 9 and longitudinal wires 10, the pairs tending to decrease the size of the pockets, and therefore adapt them to receive the point of the egg and form a support for the same, the upper pockets being of a size to receive the largest portion of the egg. The lower wire frame is flush with the under edge of the transverse bars 3, and the upper wire frame is flush with the upper edges of said bars and of the side bars 2, so that ample space occurs between the lower wire frame of one tray and the upper wire frame of the next lower tray. The side bars at one side of the tray are provided with opposite keepers 11, and are provided with similar keepers 11 at the opposite side upon all trays, except the upper, which latter is provided upon one side with a keeper 11 and with an L-shaped pivoted locking-bolt 12 near its opposite ends. The sections or trays are piled one upon the other, as shown, and under the lower section is located a bottom board 13, which board has tacked thereto near its opposite end opposite straps 14, the terminals of the straps being passed through the keepers 11 of each of the superimposed sections, and said straps are of a length adapting them to reach to the upper edge of the last or highest section or tray. The straps are provided at one of their ends with openings or perforations 15 and at their opposite ends with slots 16.

17 represents the covering-board, provided at its opposite ends and upon its under side with transversely-disposed cleats 18, adapted to rest upon the transverse bars 3 of the upper tray, and intermediate its ends, at its opposite longitudinal sides and upon its under surface, said board is provided with space-blocks 19, so that when in position upon the series or tier of trays spaces 20 are formed at the opposite longitudinal side of the structure between the under surface of said top and the longitudinal side bars of the upper tray.

The upper surface of the cover 17 at its opposite ends is provided with metal straps, the ends of which depend below the opposite sides of the cover and at one side terminate in hooks 22 and at the opposite side are longitudinally slotted, as at 23. After the trays have been mounted upon the bottom board and the metallic straps 14 passed up through the series of keepers 11, the hooks 22 of the metallic straps 21 are interlocked with the perforations 15 of the straps, and the cover is thereby hinged to the carrier. To lock the cover, it is simply necessary to close the same down upon the series of crates, when it will be observed that the longitudinal slots 23 of the straps 21 register with the L-shaped locking-bolts and the longitudinal slots of the straps 14. It is now simply necessary after introducing the bolts through the registering slots of the two straps to give said bolts a partial rotation, and thus lock the straps together and the cover upon the case.

If desired, and as shown in Fig. 3, I may interpose between the opposite side bars of each tray a transverse brace-bar 24, said bar preferably being of A shape or triangular in cross-section, and of a width agreeing with the space between the upper and lower wire-netting. The strands of the upper wire-netting rest in grooves or notches 25, formed in the apex or ridge of the brace, while those of the lower netting are fastened to the bottom or base thereof by means of wire staples 26. By means of this brace any sagging or tendency upon the parts of the nettings to approach each other is avoided.

Having thus described my invention, what I claim is—

1. In an egg-crate, the combination, with a series of oblong frames or trays, the end bars of which are narrower than the side bars thereof, and the opposite side bars are provided with keepers arranged in vertical alignment, of a bottom and top board mounted upon the trays, and metallic straps passing through the keepers and adapted to bind the trays and boards together, substantially as specified.

2. The combination, with the series of trays, the end bars of which are narrower than the side bars, thus combining to form opposite end openings, of a bottom board and a covering-board, the latter provided upon its under side and at opposite ends with transverse cleats for resting upon the side bars of the tray, and metallic straps for binding the tray's bottom and cover together, substantially as specified.

3. The combination, with the series of oblong trays provided with egg-receiving pockets and composed of opposite side bars and opposite end bars, the latter being of a less width than the former, and the former provided with opposite pairs of keepers, and the upper tray at one side with a pair of L-shaped locking-bolts, of a bottom board having opposite metallic straps secured to the same, the terminals of the straps being passed through the aforesaid keepers, two of said terminals having perforations and the opposite two longitudinal slots, the covering-board and the opposite metallic straps thereon, the ends of said straps depending at the sides of the board and terminating at one side in hooks for engaging the perforations of the before-mentioned metallic straps, and at the opposite side longitudinally slotted to register with the slots of the said before-mentioned strap, and adapted to be connected to the same by means of the L-shaped bolts, substantially as specified.

In testimony that I claim the foregoing as my own I have hereto affixed my signature in presence of two witnesses.

JAMES L. REEVES.

Witnesses:
B. A. NOWLIN,
J. D. JORDAN.